(12) United States Patent
Jackson

(10) Patent No.: US 11,087,257 B2
(45) Date of Patent: *Aug. 10, 2021

(54) SYSTEM AND METHOD FOR MODULAR CUSTOMIZATION OF INTERMEDIATE BUSINESS DOCUMENTATION GENERATION

(71) Applicant: Jabil Inc., St. Petersburg, FL (US)

(72) Inventor: Paul Michael Jackson, St. Petersburg, FL (US)

(73) Assignee: JABIL INC., St. Peterburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,727

(22) Filed: Aug. 23, 2019

(65) Prior Publication Data

US 2019/0378072 A1    Dec. 12, 2019

Related U.S. Application Data

(63) Continuation of application No. 14/680,650, filed on Apr. 7, 2015, now Pat. No. 10,430,742.

(51) Int. Cl.
    *G06Q 10/06* (2012.01)
    *G06F 3/0486* (2013.01)
    *G06F 3/0484* (2013.01)

(52) U.S. Cl.
    CPC ..... *G06Q 10/06316* (2013.01); *G06F 3/0486* (2013.01); *G06F 3/04842* (2013.01)

(58) Field of Classification Search
    None
    See application file for complete search history.

(56) References Cited

U.S. PATENT DOCUMENTS

| | | | | |
|---|---|---|---|---|
| 2003/0195762 A1* | 10/2003 | Gleason | ........... | G06F 9/548 705/1.1 |
| 2005/0251527 A1* | 11/2005 | Phillips | ........... | G06Q 10/06 707/999.101 |
| 2006/0059460 A1* | 3/2006 | Phillips | ........... | G06Q 10/06316 717/109 |
| 2007/0288934 A1* | 12/2007 | Khan | ........... | G06F 9/542 719/318 |

(Continued)

*Primary Examiner* — Ryan D. Coyer
(74) *Attorney, Agent, or Firm* — Thomas J. McWilliams; Barnes & Thornburg LLP

(57) ABSTRACT

Systems and methods capable of providing customized business processes, such as with regard to intermediate business transaction documents, within a standard business process flow system. The systems and methods may include a process interface for receiving the standard business process flow; a developmental graphical user interface capable of developing a plurality of object-oriented custom modules indicative of a plurality of custom business steps; a plurality of data libraries capable of storing at least configurations and rules applicable to the plurality of object-oriented custom modules; a run time graphical user interface capable of selecting multiple ones of the plurality of object-oriented custom modules for inclusion in a custom process stack; and a trigger sensor capable of receiving a trigger indicated by one of the configurations at the process interface, and capable of diverting the standard business process flow to process the custom process stack related to the trigger according to the configurations and rules upon receipt of the trigger.

20 Claims, 20 Drawing Sheets

(56) References Cited

U.S. PATENT DOCUMENTS

| | | | | |
|---|---|---|---|---|
| 2011/0276968 A1* | 11/2011 | Kand | .................... | G06F 9/5038 |
| | | | | 718/102 |
| 2014/0316843 A1* | 10/2014 | Bukovec | ............ | G06Q 10/0633 |
| | | | | 705/7.27 |
| 2016/0098661 A1* | 4/2016 | Viswanathan | ... | G06Q 10/06316 |
| | | | | 705/7.26 |

* cited by examiner

| StackModule | StackType | Step | Type | EPIC IDOC Type | Module Short Help Text | Active X=Y | Zebra Mod... |
|---|---|---|---|---|---|---|---|
| IDOC_INPUT_CREDITOR | Inbound | Posting | Function | CREMAS | AMS BRAZIL | true | ☐ |
| IDOC_INPUT_DELINS_START | Inbound | Pre-pro... | Function | FORECAST | SCHEDULING AGREEMENT | true | ☐ |
| IDOC_INPUT_DELVRY | Inbound | Posting | Function | ASN | DELIVERY CHANGE FOR REMOVING_ | true | ☐ |
| IDOC_INPUT_DESADV1 | Inbound | Posting | Function | ASN | INBOUND DELIVERY | true | ☐ |
| IDOC_INPUT_FIDCC2 | Inbound | Posting | Function | FI_DOC_UPDATE | STANDARD POSTING PROCESSING M_ | true | ☐ |
| IDOC_INPUT_EU_CREATE | Inbound | Posting | Function | FU | POSTING MODULE FOR HANDLING V_ | true | ☐ |
| IDOC_INPUT_INVOIC_F1 | Inbound | Posting | Function | INVOICE | INVOICE | true | ☐ |
| IDOC_INPUT_INVOIC_MAM | Inbound | Posting | Function | INVOICE | INVOICE | true | ☐ |
| IDOC_INPUT_MATMAS01 | Inbound | Posting | Function | MATMAS | MATERIAL MASTER CREATION | true | ☐ |
| IDOC_INPUT_ORDCMG | Inbound | Posting | Function | ORDERS | SALES ORDER CHANGE - BDC | true | ☐ |
| IDOC_INPUT_ORDERS | Inbound | Posting | Function | ORDERS | SALES ORDER CREATE - BDC | true | ☐ |
| IDOC_INPUT_ORDRSP | Inbound | Posting | Function | ORDERS | PURCHASE ORDER RESPONSE | true | ☐ |
| IDOC_INPUT_PORDCH | Inbound | Posting | Function | ORDERS | POST PURCHASE ORDER | true | ☐ |
| IDOC_INPUT_PORDCR1 | Inbound | Posting | Function | ORDERS | POST PURCHASE ORDER CREATE | true | ☐ |
| IDOC_INPUT_PPCO2PRETICKET | Inbound | Posting | Function | CONFIRMATION | PRODUCTION ORDER CONFIRMATION_ | true | ☐ |
| IDOC_INPUT_PREQCHANGE | Inbound | Posting | Function | PREQCHANGE | CHANGE ENJOY PURCHASE REQUISI_ | true | ☐ |
| IDOC_INPUT_PREQCR1 | Inbound | Posting | Function | PREQCR1 | CREATE ENJOY PURCHASE REQUISI_ | true | ☐ |
| IDOC_INPUT_SALESORDER_CREATEFR | Inbound | Posting | Function | ORDERS | SALES ORDER CREATE - RAPI | true | ☐ |
| IDOC_INPUT_SBINV_START | Inbound | Posting | Class | INVOICE | CREDIT MEMO PROCEDURE WITH IN_ | true | ☐ |
| IDOC_OUTPUT_DELVRY | Outbound | Posting | Function | ASN | ASN | true | ☐ |
| IDOC_OUTPUT_INVOIC | Outbound | Posting | Function | INVOICE | INVOICE | true | ☐ |
| IDOC_OUTPUT_ORDCHG | Outbound | Posting | Function | ORDCHG | PURCHASE ORDER CHANGE | true | ☐ |
| IDOC_OUTPUT_ORDERS | Outbound | Posting | Function | ORDERS | PURCHASE ORDER | true | ☐ |
| IDOC_OUTPUT_ORDRSP | Outbound | Posting | Function | ORDERS | ORDER RESPONSE | true | ☐ |
| IDOC_OUTPUT_SHPMNT | Outbound | Posting | Function | SHPMNT | | true | ☐ |
| L_IDOC_INPUT_KMMBXY | Inbound | Posting | Function | RECEIPT | GOODS MOVEMENTS IN IM | true | ☐ |

All Stack Modules View | Search Stack Modules | Copy Partner / Message Type From Pre-processing  Before posting  Posting  After posting  Error Handling EPIC 2.0 Configuration Dashboard - Maintain Stack Modules Partner 89646
Message Type B2B3A4    Workflow De-Activated ☐
Direction 2    No of days to keep workflow: 00

Save

| Module Type/Module | Help Text |
|---|---|
| ▼ Before posting | |
| • Z_HP_IDOC_INBOUND_CHING_PO | ☐ |
| • ZCL_EPB_BOM_VALIDATION | ☐ |
| • ZCL_EPB_CGOF_CHECK_SO_CHANGES | ☐ |
| • ZCL_EPB_CHECK_PROD_ORDER_EXIST | ☐ |
| • ZCL_EPB_CHECK_PROD_ORDER_GOF | ☐ |
| • ZCL_EPB_CISCO_GOF_VALIDATION | ☐ |
| • ZCL_EPB_DELV_PGI_CHECK | |
| • ZCL_EPB_EMERSON_ORDCHG | |
| • ZCL_EPB_FDS_LB_ND_CREATE | |

Back

Parameters

| Module Type/Module | Help Text | Sequence Number | Module Short Help Text |
|---|---|---|---|
| ▼ Before posting | | | |
| • ZCL_EPB_DUPLICATE PO | ☐ | | |
| • ZCL_EPB_I_SD_GOFMAT_EDIT | ☐ | | |
| • ZCL_EPB_I_NETAPPS_PREP_PROC | ☐ | | |
| • ZCL_EPB_NA_SEGMENT_CLEANING | ☐ | | |
| • ZCL_EPB_NA_IDOC_EXPLODE | ☐ | | |
| • ZCL_EPB_I_05_VC_CTO_CREATE | | | |
| ▲ Posting | | | |
| ▲ After Posting | | | |
| ▲ Error Handling When No Documen | | | |

SYSTEM AND METHOD FOR MODULAR CUSTOMIZATION OF INTERMEDIATE BUSINESS DOCUMENTATION GENERATION

CROSS-REFERENCE TO RELATED APPLICATIONS

This application claims the benefit of priority to U.S. application Ser. No. 14/680,650, filed Apr. 7, 2015, entitled System and Method for Modular Customization of Intermediate Business Documentation Generation, the entirety of which is incorporated herein by reference.

BACKGROUND

Field of the Disclosure

The present disclosure relates to generation of custom business documentation, and, more particularly, to systems and methods for modular customization of intermediate business documentation generation.

Background of the Disclosure

It is known to provide business process software to allow for enterprises to streamline and expedite the performance of various business processes, such as generation of a purchase order, a receipt, or the like. This is particularly the case for businesses that engage in, for example, e-commerce. However, it is also typical that it is exceedingly difficult to deviate from the defined processes made available in such business process software. That is, custom business processes are very difficult to design and implement using known business process software for the enterprise, unless, of course, one is a highly skilled programmer.

This is generally the case because known business process systems provide a variety of algorithmically designed business processes, and any deviation from the provided business processes requires code customization. More particularly, custom business processes generally necessitate the writing and implementation, within the enterprise business software, of specific and unique code to implement the custom business process. Although this custom code may be of any known form, it generally must be written by one well versed in the writing of computer code, and it must readily interface with the business process software used by the enterprise.

A standard business process flow may be provided using, by way of non-limiting example, the SAP® business process system (the "SAP system"). In the SAP system, an "IDoc," or intermediate document, is a standard data structure for electronic data interchange (EDI) between application programs written for the SAP business system, or between an SAP application and an external program. IDocs are used for asynchronous transactions in which each IDoc comprises a self-contained text file that can then be transmitted to the requesting workstation without connecting to the central database.

In the SAP "standard flow", modification to, or to the treatment of, an IDoc, i.e., modification to the text of an IDoc or the process to which it is subject from standard processes, necessitates code customization. That is, a custom business process requires expert custom coding to create the custom process within the SAP standard flow. This is necessary for each instance of a custom process—meaning that, even if a similar customization has been provided in a different standard process flow, the coding must be performed anew each time the custom process must be inserted to a different standard process flow.

Therefore, the need exists for a more suitable system and method for providing a custom documentation-based business process within known standard flow business process systems, without need of code customization to provide the custom business process in each case.

SUMMARY OF THE DISCLOSURE

The disclosed exemplary embodiments include systems and methods capable of providing customized business processes, such as with regard to intermediate business transaction documents, within a standard business process flow system. The systems and methods may include a process interface for receiving the standard business process flow; a developmental graphical user interface capable of developing a plurality of object-oriented custom modules indicative of a plurality of custom business steps; a plurality of data libraries, wherein at least one of the plurality of data libraries is at least semi-private and at least one is semi-public, capable of storing at least configurations and rules applicable to the plurality of object-oriented custom modules; a run time graphical user interface capable of selecting, via a drag and drop interface, multiple ones of the plurality of object-oriented custom modules for inclusion in a custom process stack; a trigger sensor capable of receiving a trigger indicated by one of the configurations at the process interface, and capable of diverting the standard business process flow to process the custom process stack related to the trigger according to the configurations and rules upon receipt of the trigger; and a return interface that returns an output of the custom process stack to the standard business process flow.

The exemplary systems and methods may additionally include: an administrator graphical user interface capable of modifying at least one of the process interface and the return interface; a reporting interface capable of providing at least status of at least the standard business process flow and the custom process stack; and/or a partner interface capable of providing data regarding at least the custom process stack to one or more partners indicated by at least one of the rules.

Accordingly, the disclosure provides systems and methods for providing a custom documentation-based business process within known standard flow business process systems, without need of code customization to provide the custom business process in each case.

BRIEF DESCRIPTION OF THE FIGURES

Understanding of the present disclosure will be facilitated by consideration of the following detailed description taken in conjunction with the accompanying drawings, in which like numerals refer to like parts, and wherein:

FIG. 8 is an illustration of a GUI according to an exemplary embodiment;

FIG. 12 is an illustration of a GUI according to an exemplary embodiment;

DETAILED DESCRIPTION OF THE EMBODIMENTS

Figure 1:
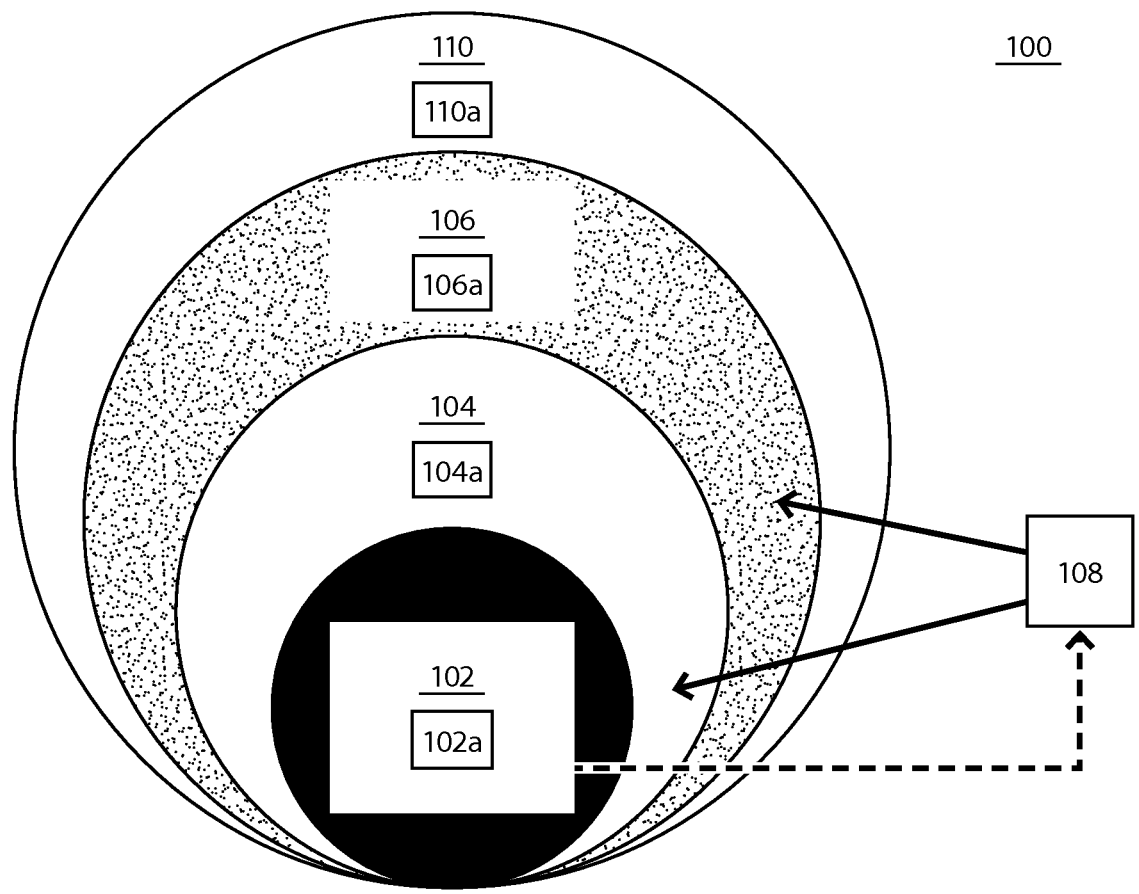
FIG. 1 is an architectural diagram illustrating a core engine and hierarchy based thereon in exemplary embodiments.

It is to be understood that the figures and descriptions of the present disclosure have been simplified to illustrate elements that are relevant for a clear understanding of the disclosed exemplary embodiments, while eliminating, for the purpose of clarity, many other elements found in typical similar systems, processes, and modules. Those of ordinary skill in the art may thus recognize that other elements and/or steps are desirable and/or required in implementing the examples of the present disclosure. However, because such elements and steps are well known in the art, and because they do not facilitate a better understanding of the disclosure, a discussion of such elements and steps is not provided herein. The disclosure herein is nevertheless directed to all such variations and modifications to such elements and methods known to those skilled in the art.

The disclosed embodiments allow for deviation from "prepackaged" intermediate document-centric business processes typically made available in known enterprise business process software. This deviation is preferably available without necessitating the implementer of a custom business process to develop customized code to perform the custom business process, and particularly without necessitating code customization in each case in which a deviation from a standard flow is needed—even if the same customization was already coded in another standard process flow. Rather, the disclosed embodiments use object oriented techniques to allow for the development, definition, and implementation of a custom business process via a custom process stack.

The custom process stack may be built by selecting modules, wherein the selectable modules may include previously developed elements for other custom business processes, and as such wherein the modules may be reused across multiple customers, multiple custom processes, and the like. Accordingly, the disclosed exemplary embodiments allow for the implementation of heretofore unknown custom processes, as well as the implementation of known custom processes in standard process flow systems in which such custom processes were previously unavailable with undue effort and experimentation.

Based on the selectability of modules, users may recycle modules developed for/implemented in one business process for use in a different business process. The implementation of a custom process stack using object oriented techniques also allows the disclosed embodiments to provide simplified graphical user interfaces (GUIs), also referred to herein as "dashboards," at various process levels, which process levels may include administrative, developmental, and process execution phases, in which known techniques of module programming selection, such as "drag and drop" of blocks indicative of modules, may be instituted in, for example, web-based or app-centric formats.

Within the standard enterprise business software environment known to the skilled artisan, the disclosed embodiments may reroute the business process software out of its standard process flow to a custom process stack, if the custom process stack is called based on its respective triggering criteria. The calling of a custom process stack may begin with the design/development of a unique process stack, the design of a partially unique process stack, or the processing of a developed custom stack. Following the design and/or processing of the custom stack, the disclosed embodiments may return route from the custom process to the standard process flow of the base module or modules of the standard enterprise business process software environment.

An enterprise architecture to implement a core engine that may provide the disclosed functionality as extensions of the core engine may be segmented into four layers, namely presentation, business logic, data logic, and communications/routing. The core engine may provide configurable interfaces, i.e., the aforementioned GUIs/dashboards, to recognize, handle, and/or design various stacks, relationships with various internal and external entities, and various message and data types. The configuration of each such interface, and of stacks designed or implemented therein, and of the modules and module steps of the stacks, may be stored locally or remotely, such as in one or more libraries, and may include configuration settings based on stack, module, partner, message, or data type, by way of non-limiting example.

The disclosed architecture may provide tools that allow integration of the core engine with any of various known types of standard business process systems, such as those offered by SAP® as discussed above, and those not offered by SAP. As such, the disclosed embodiments may provide multi-platform custom process flow system embodiments, even where specific exemplary standard process platforms and systems, such as that of SAP, are discussed in exemplary embodiments detailed herein. The aforementioned integration with standard process flow systems may allow for: modification of documents, intermediate documents, or other data relevant to business processes, which modifications are then re-posted from the custom flow to the standard flow after modification; alerts (such as via email or in-app) in the event of errors in a custom flow; status and reporting for both custom and standard flow; and the like.

In a particular exemplary embodiment, a custom process stack may be integrated with a standard process flow to, for example, handle errors and allow managed message re-processing. Such custom stacks may include modules to: generate alert notifications during communication and message processing failures; generate alert notifications for messages as required by business rules; and/or resubmit failed messages to process again.

Similarly, a custom process may be provided to indicate the triggering circumstances for, define a configuration of, define style and format for, and generate custom internal and/or partner notifications related to, a custom business process that generates data, such as documentation. Such a custom process may, for example, utilize distribution lists and/or partner contact information, and may build notification messages based on configurable, custom workflows specific to such a distribution list or business partner. These configurable, custom workflows may monitor work flows, and may correspondingly send alerts to operations and support based on the monitoring.

For each hierarchical level within the enterprise architecture mentioned above, a management, development, and/or configuration graphical user interface (GUI), or dashboard, may be provided. The GUI may, for example, be consistently or differentially provided on a mobile or stationary computing devices. The GUI may allow for the creation, display, causation, update, and/or deletion of aspects of data, such as aspects of an IDoc, uniquely for each message data type and/or recipient. Thereby, message data and data generally may be distinct as between internal and external personnel, and/or may be unique or generic to particular external persons or across multiple or all external persons.

Yet further, the architecture may allow, such as via the afore-discussed GUI, the display of the monitoring of and reporting on operational metrics and errors, by way of non-limiting example. This additionally allows for the logging of data for standard and custom message flows and errors, and the providing of reports on status, such as message status updates.

The enterprise architecture 100 may be illustratively defined using a concentric hierarchy diagram, as shown in FIG. 1. As shown in FIG. 1, the core engine may provide the basis for the customization of processes. The core engine 102 should not be modified except in the rarest of circumstances, and at that only by highly expert administrative personnel, as modification to the core engine impacts the entire architecture and all modules, stacks, and libraries therewithin. Accordingly, an administrative dashboard 102a may be provided for access to core functionality exclusively by high level administrative, or "super," users. The administrative dashboard 102a may comprise administrative elements of corporate process functionality, and/or administrative elements related to custom stack modules and the interface thereof with standard flows.

Illustratively "around" the core engine and administrative functionality may be provided an "internal" development zone 104, in which is provided the development dashboard 104a discussed herein throughout. The development zone 104 allows for development of various custom stack modules, to which are applied the configuration definitions and rules that form the libraries in the library zone about the internal development zone. In this zone 104, for example, and object class may be provided to perform purchase order duplication checks on a sales order process. It is this developmental portion 104 of the hierarchy that allows for the locating, adaption, or development of new modules for inclusion in custom stacks.

Illustratively "around" the libraries of rules and configurations for the developed modules, and the developed modules themselves, may be provided the run time zone 106. In the run time zone 106, a user may formulate a stack of modules from the development zone 104, subject to the definitions of the library zone. Access to the modules, i.e., via search, request, selection, or otherwise, may also be defined in the run time zone for providing in the run time dashboard 106a. The run time dashboard 106a subjects selected modules to configuration elements, such as JAVA and mobile elements, which implement rules to allow for performance of that module uniquely within a custom stack.

The run time dashboard 106a accessibility to the modules provided from the development dashboard 104a may be provided to users in any form known in the art, such as a guided process, a wizard 108, or the like. That is, a user may be asked a series of questions from which a limited subset of models may be selected or made available for selection to allow the user to implement the desired custom process, and/or the user may be provided with search capabilities, drop-down menus, hierarchies, file selections, or the like that may allow the user to actively seek out selection of module or modules that the user believes may best implement a desired custom process. As referenced, the run time build process may be visually performed in a manner indicative of the object oriented nature of the disclosed embodiments—meaning the user may select "block" modules and drag and drop those modules in a position or positions, and/or in any particular order, to best effectuate the user's desired custom process.

More particularly, because custom stacks may often use similar functions/stack modules, a custom stack configuration wizard may generate custom stacks using existing modules when possible. The wizard may use metadata from the module attributes to supply user-friendly information for the in-dashboard wizard. The wizard may select these existing stacks and stack modules either as partner-specific options, or partner-agnostically, such as from an internal library, a remote, global library, or preferentially in a given order from these or other library sources.

In addition, such a wizard may provide, both in the development and run time dashboards, standard templates to develop, and to structure and run, message stacks. Templates represent default business processes that can be used as is, or copied and customized in the development zone. These templates allow for the development and execution of custom business processes. Further, multiple modules may be enabled for inclusion into a stack by selecting a single template.

The wizard may accordingly comprehend different message types and how they are used by different business objects, so features associated with these different message types may be correctly grouped and searched. The grouping may be done by identifying which message types act on various business objects in the standard flow. That is, it may be determined which business object is used by the message type, such as by reviewing the list of valid message types per business object. If a new message type is needed, the necessary configuration may be built in a library accessible to the wizard to tie the subject business object and the message type together.

Correspondingly, the transaction associated with the display of the business object, and confirmation that the correct transaction will be displayed by the runtime dashboard, may occur. The features that are available for the message type/business object may then be displayed, and the user may be allowed to select the desired features, including any custom aspects and associated notes or administrative entitlements.

If a stack already exists for the desired features, the wizard may identify it for use, such as responsive to a search, and may provide information associated with any module, such as attached documents, user manuals or the like, prior use records, frequently associated errors, and so on. If a stack does not already exist for the desired features, but the modules exist to build it, the wizard may create the necessary message stack. If a stack does not already exist and at least some of the modules do not exist to build it, either the user may be allowed to access the development dashboard, or the user may enter a description of the needed functionality for a developer in the development dashboard.

Among myriad other functionality, the wizard may allow for users to determine where a specific custom module is or may be used. For example, a user may be working on a custom process for customer XYZ. The wizard may allow the user to search for customer XYZ in the stack module name or other associations in any one or more libraries administratively accessible to that user, in order that the user may reuse custom processes previously developed for customer XYZ.

The wizard may thus identify an existing message stack or create a new message stack; create a new workflow, partner, and/or organizational unit, or identify an existing one; create a new workflow responsibility or identify an existing one, and assign users to that responsibility; create or update a partner profile, message profile, or data profile; and configure rules, configurations, or data/message types, and assign features, data and modules to libraries. The wizard may allow for searching through the foregoing, and/or interaction with developers thereof, or development by the user thereof.

Figure 2:
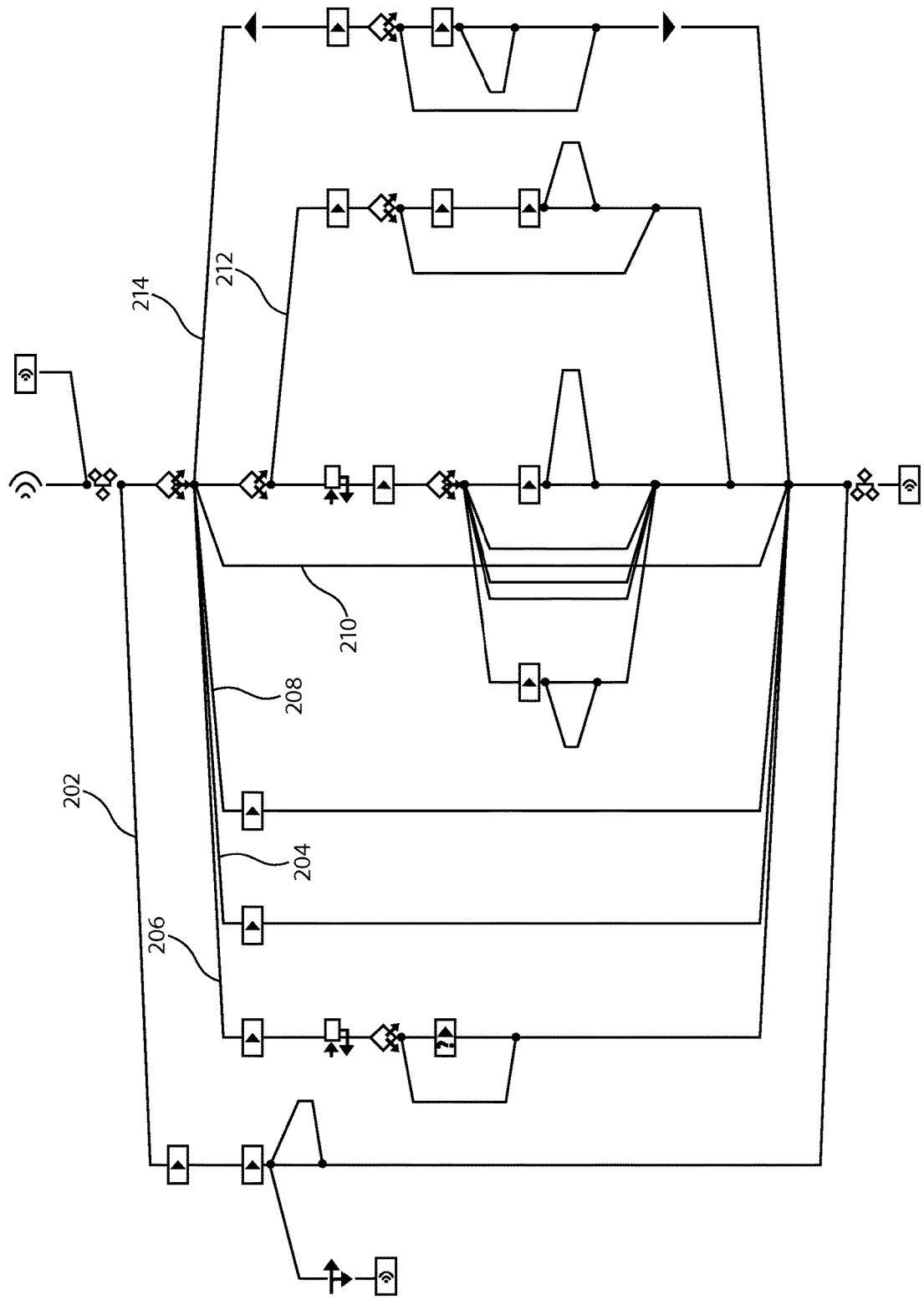
FIG. 2 is a flow diagram illustrating an exemplary custom process according to an exemplary embodiment.

In accordance with the disclosed embodiments, various processes may be made available via the run time dashboard 104a, such as for inclusion in a custom process using the disclosed wizard. For example, error-based custom processes may determine the proper actor responsive to given errors. In the exemplary embodiment of FIG. 2, multiple error paths 202, 204, 206, 208, 210, 212, 214 may be explored concurrently in a generic error notification and alert outbound flow. In the illustration, when errors occur during execution of an outbound module stack, e-mail notification of the error may be sent to the users in the organizational structure identified by a particular value in the company field in the outbound parameters of the partner profile. This field may also be used in inbound processing for determining the users responsible for error handling.

In the illustration, an error occurs or may occur in that a document may be requested that does not exist. In prior methodologies, a generic error message may be provided in such a circumstance. However, in the disclosed embodiments, the run time dashboard may allow for implementation of a variety of decision modules in a particular order that should be performed in the event of an error. As such, the decision branches make the options selected by the user and the run time dashboard. Consequently, in the disclosed embodiments and contrary to the known art, the user that caused the error, or another user as indicated by the custom process, may be presented with a series of options and or selections to cure the error based on selected custom process functionality, but the user may preferably never exposed to the underlying error work flow code (although a developer at the developer dashboard may or may not wish to access code when structuring the custom error process).

In an additional example, post processing is frequently provided in the known art. In the known art, such a process is solely implemented post, i.e., following, a given process. However, the disclosed embodiments allow for a user at the run time dashboard to drag a series of modules into a custom post processing stack that allows for a variety of functionality to be carried out after a sales order is created, i.e., post-sales order process, without any need of the implementer of the custom process to do additional coding beyond that which is already provided in the custom stack modules and the standard process flow.

Returning now to FIG. 1, encompassing the internal run time zone is the partner interface zone 110. It is via this zone 110, such as using a partner interface dashboard 100a, that access to various functionality, as defined in the libraries, may be provided to one or more transactional, external business partners. For example, only process stacks having modules developed specifically for accessibility to a specific partner may be accessible via this zone. Thereby, this may be an "externally facing" zone, such as may be used to provide an object class to perform data transformations specific to a particular customer.

More specifically with respect to the hierarchical illustration of FIG. 1, in the custom stack library, reusable, object oriented blocks that have been created in the development zone 104 are stored, in conjunction with corresponding configurations and rules. The custom stack library may preferably be searchable to users, such as via the run time dashboard 106a, wherein the search ability may be provided by rules defined in the development zone and stored in the library.

That is, a user may be able to search the libraries for object oriented modules in the category of "sales", for example, or in any other category, of use to that particular user. Moreover, the user may be able to search for and find only internal modules, or global library modules provided across numerous enterprises. The search configuration may thus have a generic aspect to allow for use across libraries subject to various different configurations or rules, such as allowing for typing of free form text into a search window when seeking custom object oriented modules. Thereby, a user may avoid having to recreate object modules that have previously been created, either for the same purpose the user intends to use the module in a current instance, or that have been created for a different reason and placed within the custom stack library.

Moreover, the custom stack library includes the referenced configuration rules that indicate when certain custom stacks are to be run, and how. The manner in which a stack executes may vary based on the configuration rules stored in one or more stack libraries, which libraries may be private and limited (such as for a subset of personnel within a company), private within a company, semi-public (available outside of the company to limited partners), or public. This is distinctly contrary to the known art, in which the lack of a library necessitates the addition of custom code for each custom process each time the custom process must be used. That is, customized modules cannot be recycled in different process stacks in the known art. Accordingly, up to 90% of the coding required in known business process software to allow for variation from standard flows may be avoided in the disclosed embodiments due to the reusable nature of the object oriented elements made available for a custom process stack. Moreover, the code library may additionally include necessary interface "hooks" to allow for interfacing of the custom stack with the standard flow across various business process system platforms. The standard flow may include, for example, processing of a sale order, generation of a purchase order, or the like. And deviations may include, for example, modification of a typical purchase order for a particular new customer.

One or more application programming interfaces (APIs) may be provided to initiate the core engine to process stacks and/or set up custom stacks via the development dashboard. The core engine may include interfacing to "plug-in" to a standard process flow engine 302, 402 that executes an embedded standard flow process, which "exits" the process from the standard flow to the custom process 304, 404, which allows the processing of the custom stack modules 306, 406 indicated to complete a given custom business process, and which then returns the process to the standard flow 308, 408. Thereby, the selected custom process deviates from the standard flow processing by executing the plug-in core to perform the custom stack modules prior to returning to the standard process flow.

The aforementioned API or APIs may allow for development of processes that initiate the core engine for respective inbound or outbound processes. Inbound process, as used herein, may include, for example, when a customer sends data/code through a standard process flow to the implementer, and the implementer processes that data/code through a custom stack at the direction of the core engine of implementer. Outbound process, as used herein, may include sending data/code output by the custom stack of the implementer to the customer.

Figure 3:
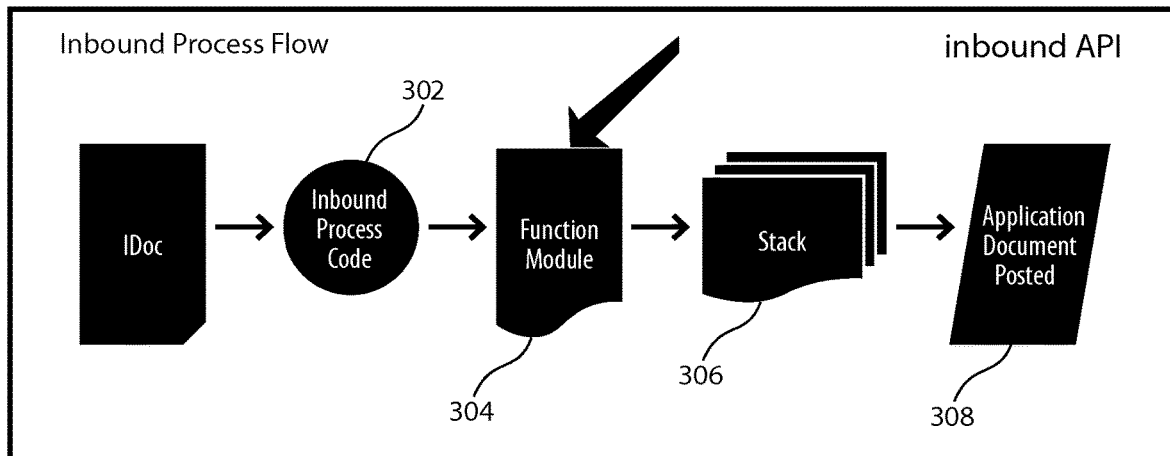
FIG. 3 is a flow diagram illustrating an exemplary inbound API embodiment.
Figure 4:
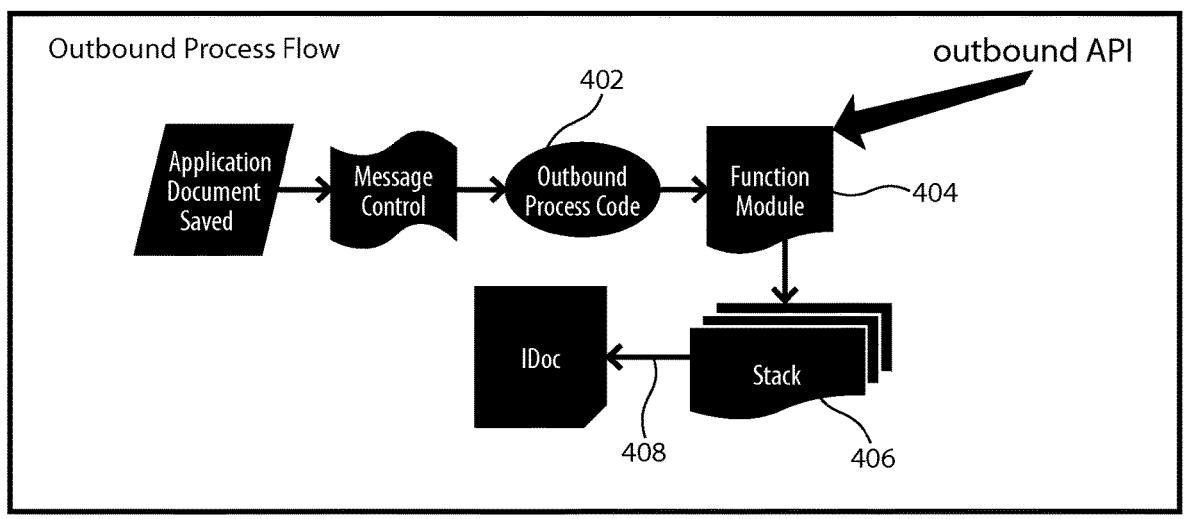
FIG. 4 is a flow diagram illustrating an exemplary outbound API embodiment.

Once initiated to run time, the core engine runs the custom stack modules, which in turn executes the underlying business logic defined by the developer for that process in the library. An inbound custom process flow is illustrated in FIG. 3. In the illustration, an inbound process is delivered to the core engine, and is subjected to the custom stack. In FIG. 4, an outbound process is delivered to the core engine, which initiates the custom stack to execute the outbound custom process.

Figure 5:
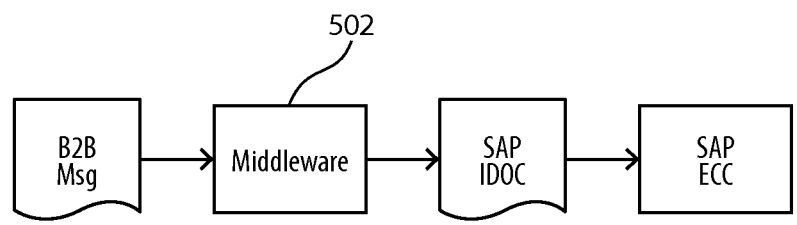
FIG. 5 is a flow diagram illustrating the replacement of middleware in an exemplary embodiment of the architecture of FIG. 1.

As referenced, processing of inbound and outbound data messages may be enabled from numerous known standard flow processing systems, and thus may be enabled from multiple different business partners and/or business systems. In a specific exemplary embodiment, although third-party message middleware 502 typically must pre-process and map inbound EDI messages into IDocs for SAP business process system consumption, the herein disclosed core engine handles the complex business logic and simplifies the mapping effort normally performed at 502 for an inbound process. More particularly, the core engine may handle non-IDoc inbound messages by processing a trigger IDoc sends from the middleware 502 after the middleware saves the inbound message data in a configured inbound location; partner and message-specific modules may then convert the non-IDoc message into business information and automate the associated business process. This is shown in the exemplary embodiment of FIG. 5. Thereby, the core engine allows configuration of custom message-handling stacks that can be linked to any number of customers, vendors, libraries, or the like for each message type.

Figure 6:
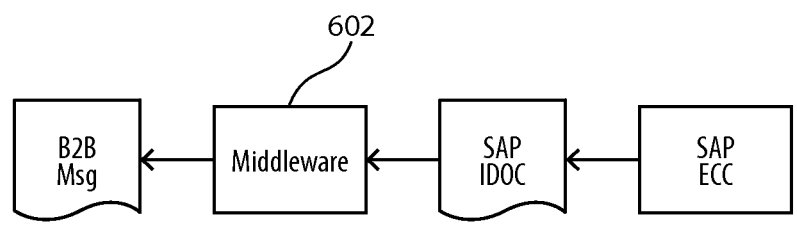
FIG. 6 is a flow diagram illustrating the replacement of middleware in an exemplary embodiment of the architecture of FIG. 1.

With regard to outbound processing of messages in a specific exemplary embodiment, standard SAP process flow and custom triggered events generate a given SAP output. The core engine may pre-processes IDoc and non-IDoc SAP outputs before delivering them to the middleware 602 or directly to a non-SAP system, as shown in FIG. 6. Thereby, the core engine allows configuration of custom message-handling stacks that can be linked to any number of customers, vendors, libraries, or the like for each message type.

As discussed above, a developer dashboard provided by and integrated with the core engine may be used for registering new custom stack modules, and for making those custom stack modules available for "external" custom processing from standard process flow systems. The developer dashboard may enable one, selected, or all existing custom stack modules, such as for a particular entity or for placement into a publicly available data library, to be made available to standard business process flows. Accordingly, the disclosed embodiments may provide reusability of custom stack modules from within the core engine.

Figure 7:
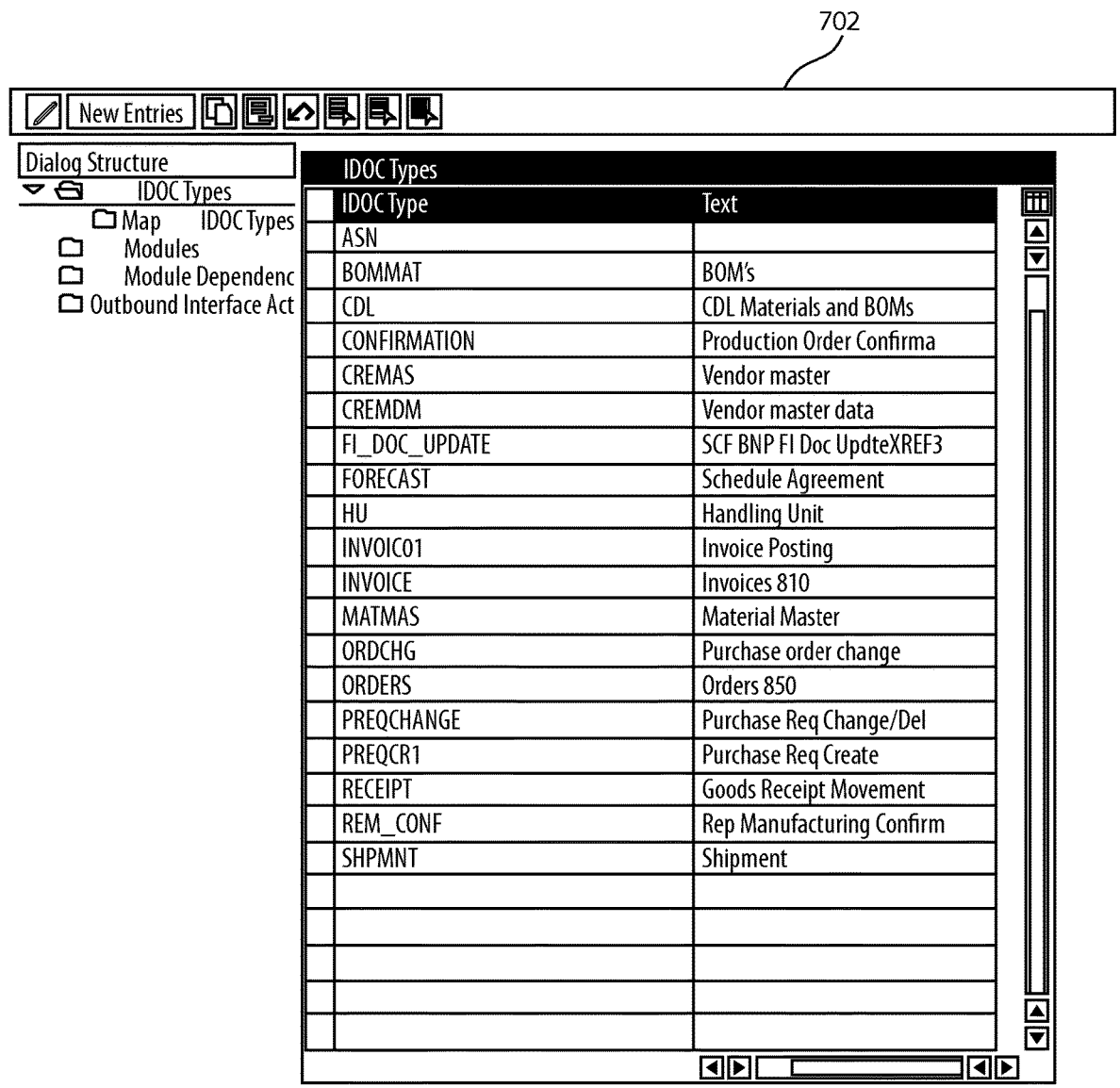
FIG. 7 is an illustration of a GUI according to an exemplary embodiment.

Different custom business processes may be registered, and associated with libraries and configurations and/or subjected to administration rules, through the developer dashboard, such as to make those custom process modules available for run time from the core engine. For example, each custom module may be registered to one or more libraries, such as an internal company library for developers of "Project A" only, internal libraries for developers of "Project A" and "Project C", to an company internal library open to all developers or to all personnel, or to a public library available to all or select third party users of the disclosed embodiments. FIG. 7 illustrates an exemplary interface 702 of the developer dashboard in which custom modules may be registered.

In addition, the configuration of the modules may include assignment of the stack module to one or more particular business processes. Likewise, configuration may include the type of stack, such as inbound or outbound processes, step type for modules, naming conventions, circumstances under which the stack may be called and by whom, and so on. Step type may include a definition of actions that will be carried out upon execution of each module in the stack. Configuration aspects may be entered via a user interface 802 of the developer dashboard such as the one shown in the example of FIG. 8.

A run time configuration dashboard may allow for the configuration of how an inbound or outbound custom process, in conjunction with a standard flow, may be processed. The run time configuration dashboard allows the user to specify the stack modules that will be executed, and the sequence in which the execution will occur. As discussed herein, the run time configuration dashboard may include a guided process and/or a wizard. Thereby, the disclosed embodiments may provide assistance in helping a user select a series of modules and/or stacks to accomplish a desired task, such as by recommending particular modules from the stack libraries.

Further, a user at the configuration dashboard may copy/reuse one or more modules, stacks, and/or configurations from within the user's administrative environment, i.e., from within the user's company, from an business partner, i.e., a customer or offer or in a given business transaction, or from a public library, to meet a current requirement. This reuse may be simplified through the providing of an intelligent search capability within the run time configuration dashboard to help a user identify existing stack modules available from the reusable stack library.

Figure 9:
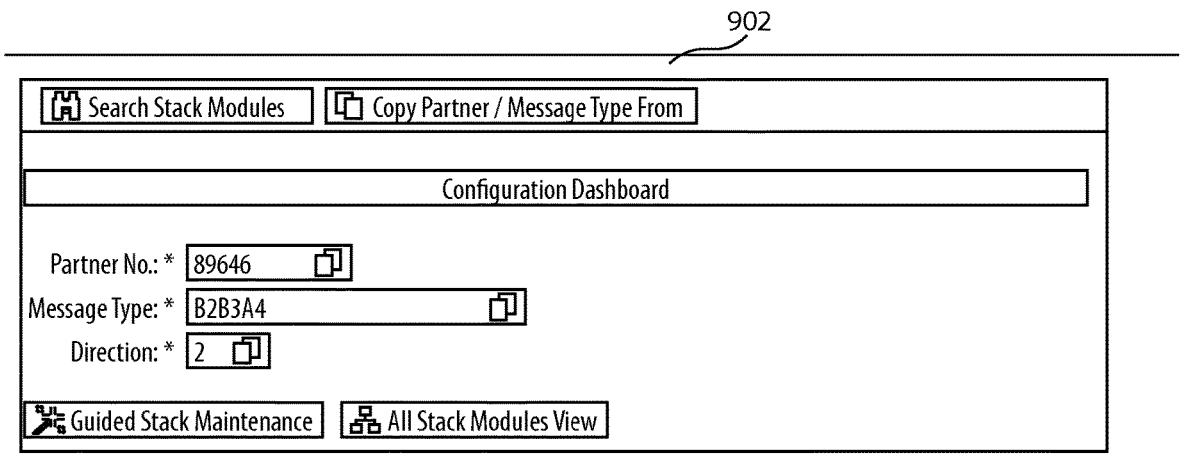
FIG. 9 is an illustration of a GUI according to an exemplary embodiment.
Figure 10:
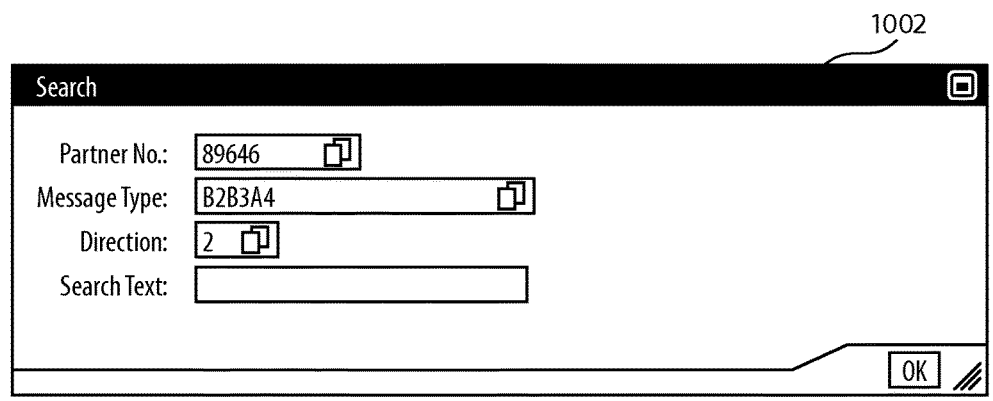
FIG. 10 is an illustration of a GUI according to an exemplary embodiment.

An initial input screen 902 for setting up a run time configuration of a custom stack module for specific business partner is shown in FIG. 9. An exemplary embodiment of an intelligent search 1002 for stacks/modules in the library of a business partner is shown in FIG. 10.

Figure 11:
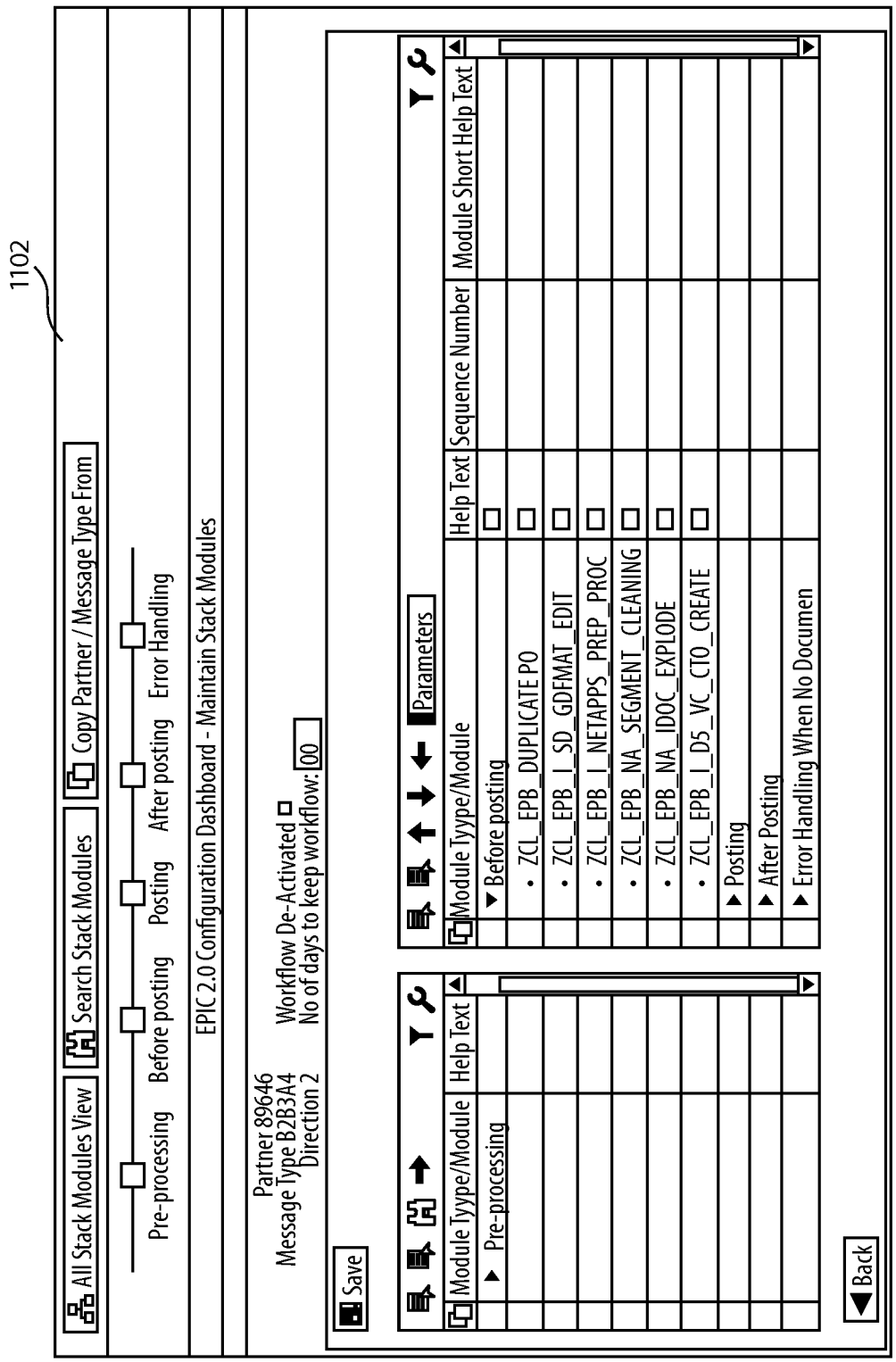
FIG. 11 is an illustration of a GUI according to an exemplary embodiment.

An exemplary main configuration interface 1102 for the run time configuration dashboard is illustrated in FIGS. 11 and 12, in which the left pane shows an available stack module for the particular selected activity from the stack library, by way of non-limiting example. Stack modules to be used from the reusable library may be dragged to the right pane, wherein the right frame may specify the final stack that will be processed by core engine for the custom business process.

A runtime dashboard may allow for custom process stack execution, stack error monitoring and resolution, and custom process reporting. The run time dashboard may be a web based dashboard.

Figure 13:
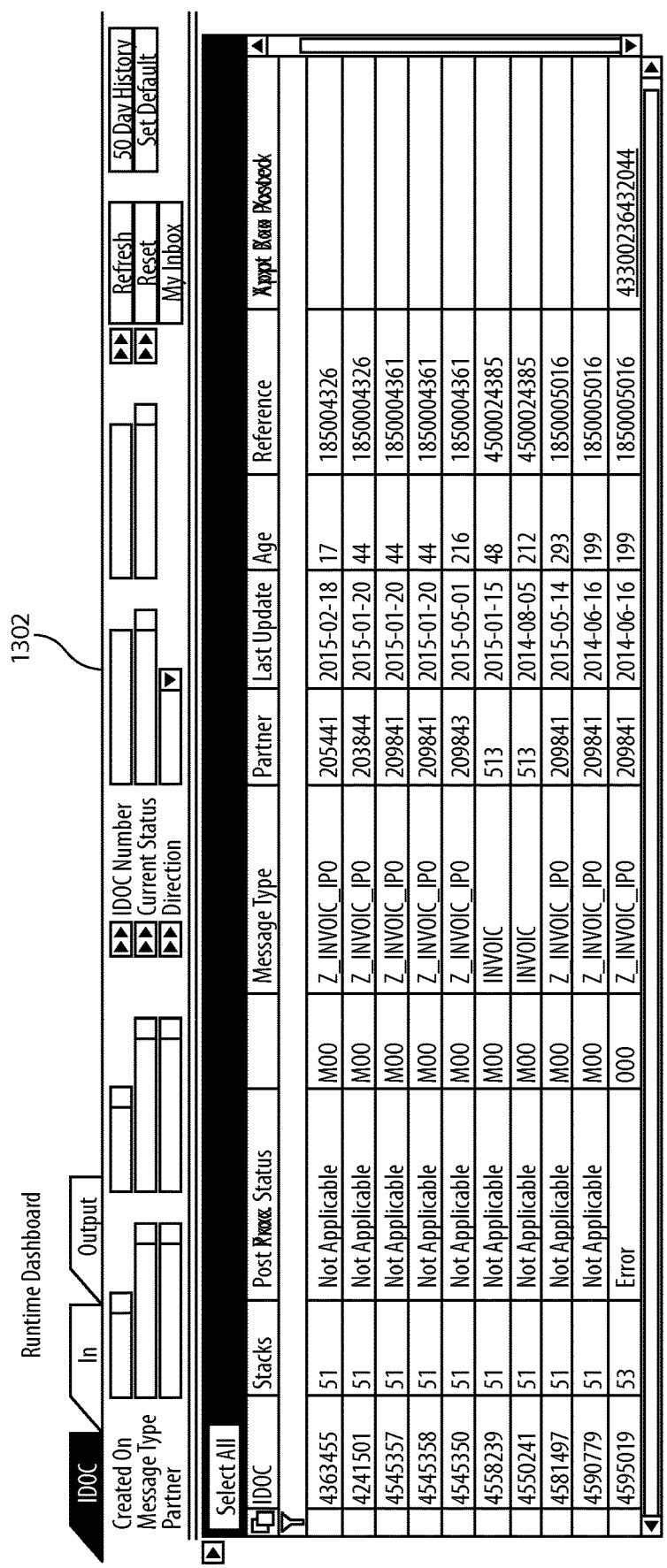
FIG. 13 is an illustration of a GUI according to an exemplary embodiment.
Figure 14:
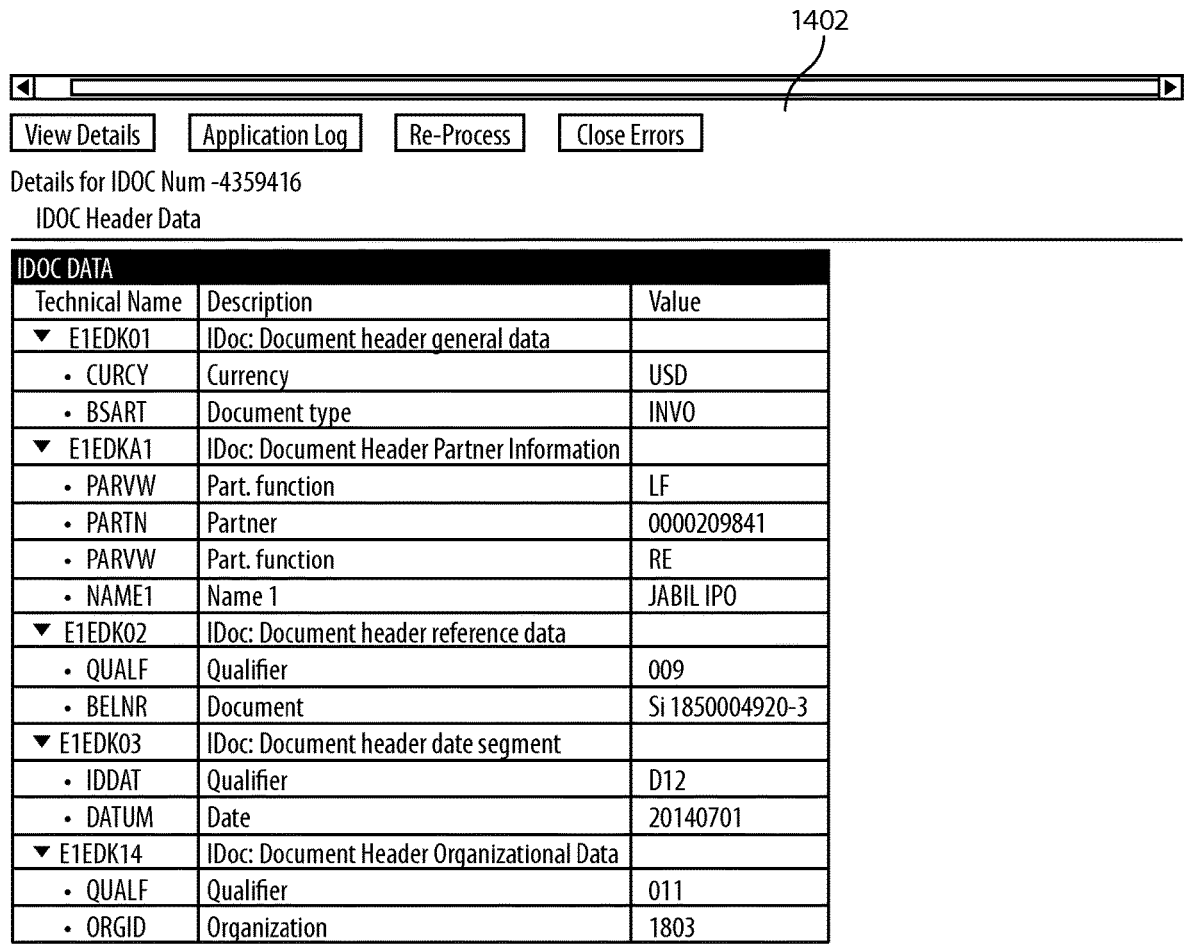
FIG. 14 is an illustration of a GUI according to an exemplary embodiment.

By way of non-limiting example, the user may have the option to see an error log for a selected custom process, and/or may arrive at and/or initiate additional custom steps toward a possible solution to fix the error. A user at the run time dashboard may also reprocess all or part of the custom process stack from the run time dashboard. If, for example, the user believes an error is irrelevant, or a new set of data is required, a forced return to the standard process flow may be effectuated from the run time dashboard. By way of example using the SAP business system, a user who deems that new data needs to be pushed from business partner may close a current IDoc from the custom stack to thereby complete its processing in the SAP standard flow. An exemplary run time dashboard interface 1302 is illustrated in FIG. 13. Drill down 1402, such as per IDoc, may be available via the run time dashboard, as is shown in the example of FIG. 14.

Of course, the afore-discussed dashboards and all other dashboards and interfaces discussed herein may not only be provided as web-based applications, but likewise may be provided as mobile apps. For example, a runtime dashboard mobile app may provide a simplified version of a web-app runtime dashboard, such as may be readily executed by iOS or AndroidOS devices. Correspondingly, a user may view errors, IDocs, and the like through the mobile app.

Likewise, a user may have the option to see detail, such as detailed error logs for analyzing an issue to arrive at possible resolution, in the mobile app. The use may additionally have reprocess/close capability from a mobile device.

A mobile app according to the disclosure may have optionality typical of mobile apps. By way of non-limiting example, a user may elect to receive push notifications upon occurrence of any IDoc error in system that has been processed through a custom process of the core engine.

Figure 15:
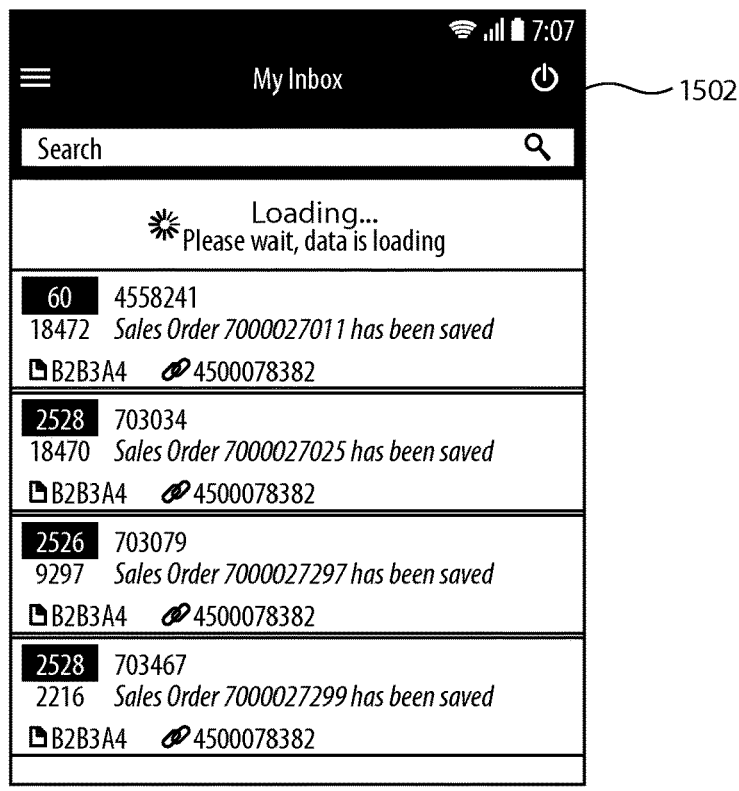
FIG. 15 is an illustration of a GUI according to an exemplary embodiment.
Figure 16:
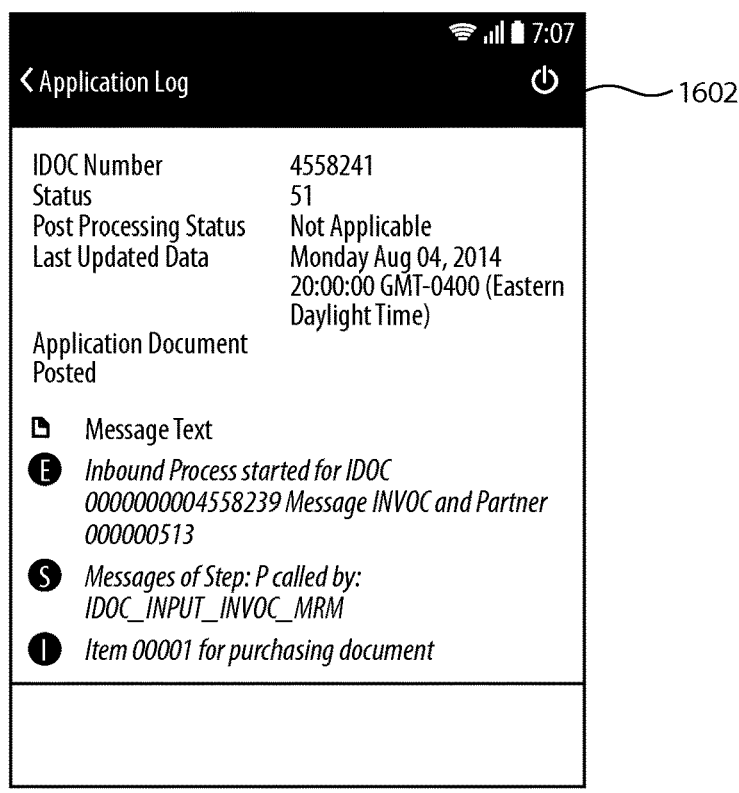
FIG. 16 is an illustration of a GUI according to an exemplary embodiment.

In a mobile app context, the user may be provided with a landing page, which may show key information for run time, such as all error items assigned to that user. An exemplary landing page 1502 for a mobile app is shown in the example of FIG. 15. Upon tapping any item on the landing page of FIG. 15, a detailed error screen 1602, such as that shown in FIG. 16, may be displayed along with other critical pieces of data. As indicated by the exemplary interface screen shot 1702 of FIG. 17, follow up actions for critical items may be displayed, such as in an overlay icon set and/or when a user swipes, such as from right to left.

Figure 17:
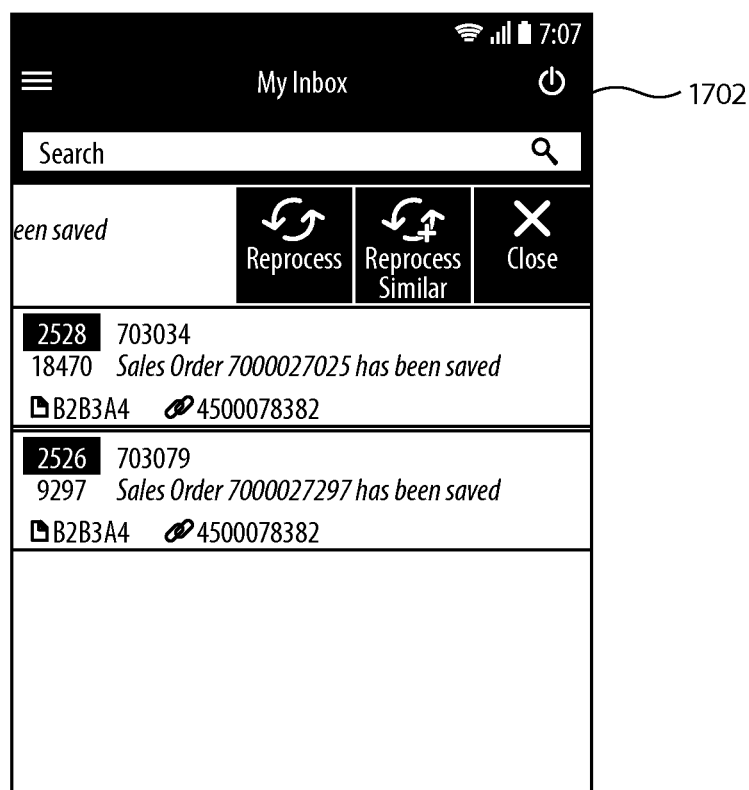
FIG. 17 is an illustration of a GUI according to an exemplary embodiment.
Figure 18:
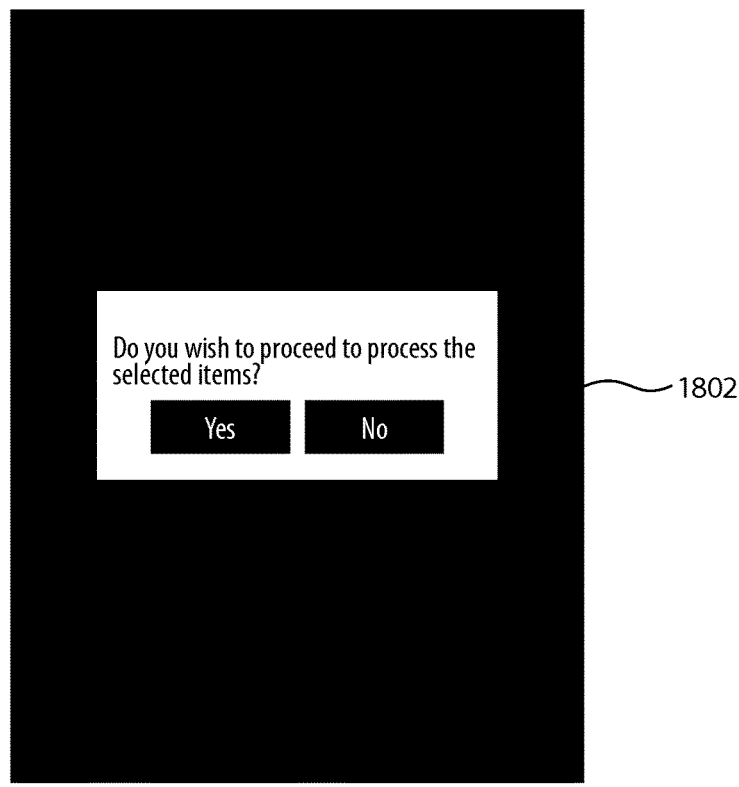
FIG. 18 is an illustration of a GUI according to an exemplary embodiment.
Figure 19:
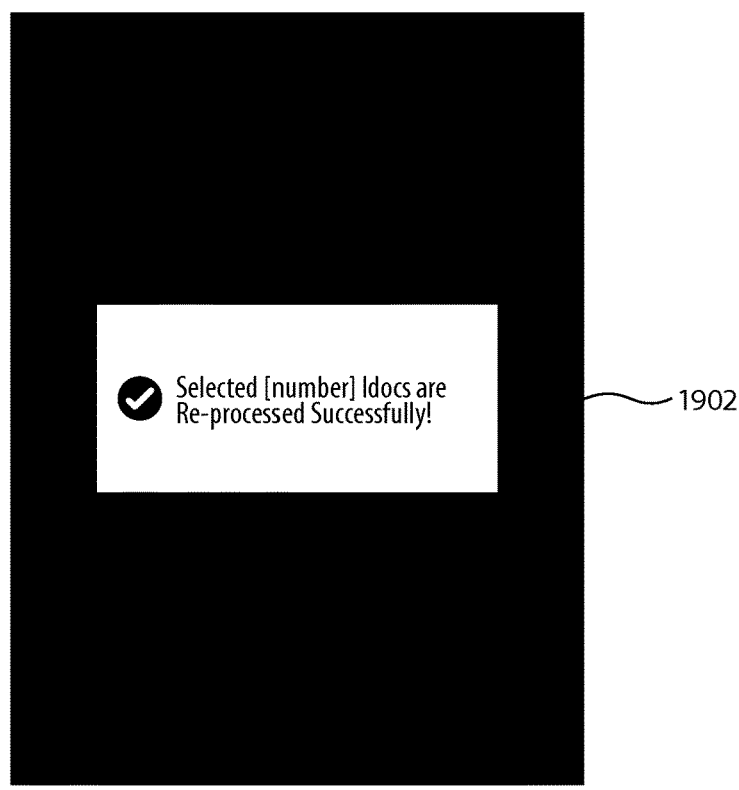
FIG. 19 is an illustration of a GUI according to an exemplary embodiment.

Upon clicking any of the follow up actions shown in FIG. 17, a confirmation pop up 1802 may appear as shown in the illustration of FIG. 18. As shown in FIG. 19, an indication of the success or failure of a user action 1902 may additionally be provided in the mobile app.

Figure 20:
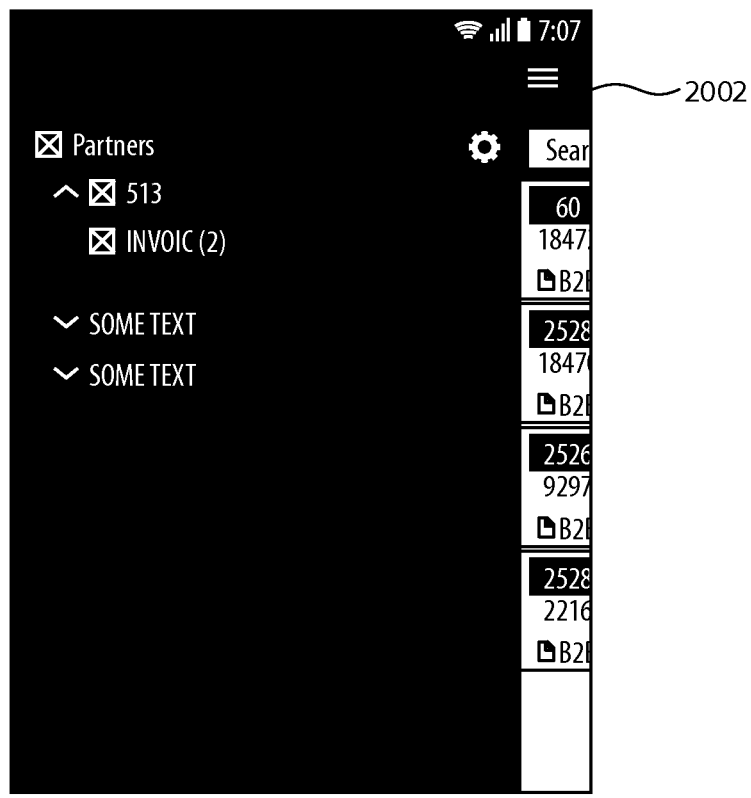
FIG. 20 is an illustration of a GUI according to an exemplary embodiment.

Additional optionality, such as additional run time filter criteria, may be provided in the typical manner for a mobile app. For example, a swipe to the left, or execution of a drop down, may cause to be provided a navigation pane on screen side left. Moreover, an inbox, such as with messages relating to actions to be taken, such as in the case of errors in custom process flows, may be selectable in the app via any known methodology. The foregoing is illustrated in the screen shot 2002 of FIG. 20.

Figure 21:
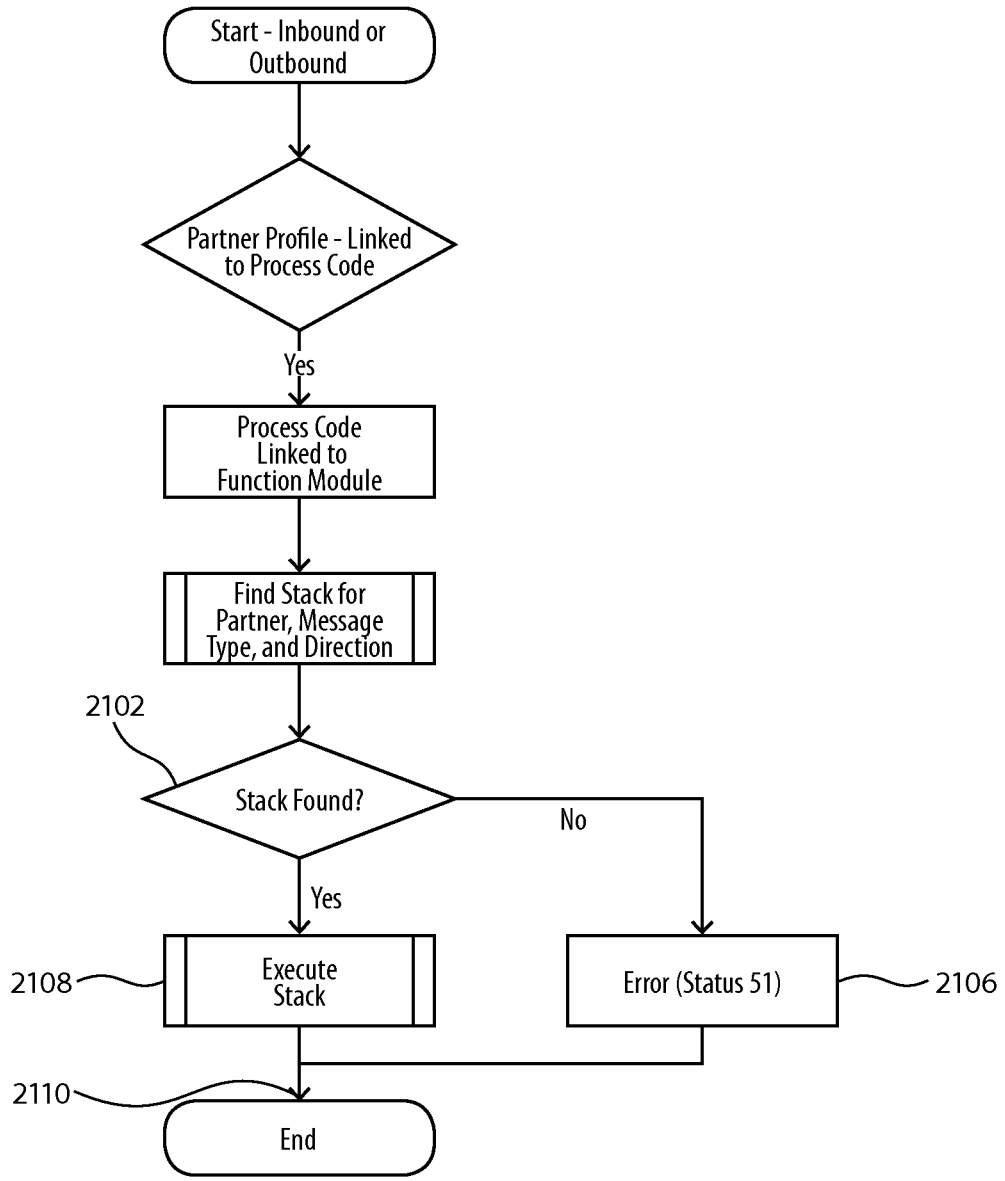
FIG. 21 is a flow diagram illustrating a re-route from a standard process to and through a custom process, according to an exemplary embodiment.

FIG. 21 illustrates an exemplary process flow 2100. In the illustration, an inbound or outbound standard process experiences a deviation based, in this example, on a custom process that is uniquely carried out for a particular business partner, as is indicated to the core engine by a process code associated with that business partner. The custom process includes structuring the indicated custom stack based on that custom process for that partner. If the custom stack or aspects thereof cannot be located 2102 or are improperly called, an error message is produced 2106. If the custom stack is properly called, structured and available, it is run 2108, and thereafter the core engine returns the process to the standard flow 2110.

Figure 22:
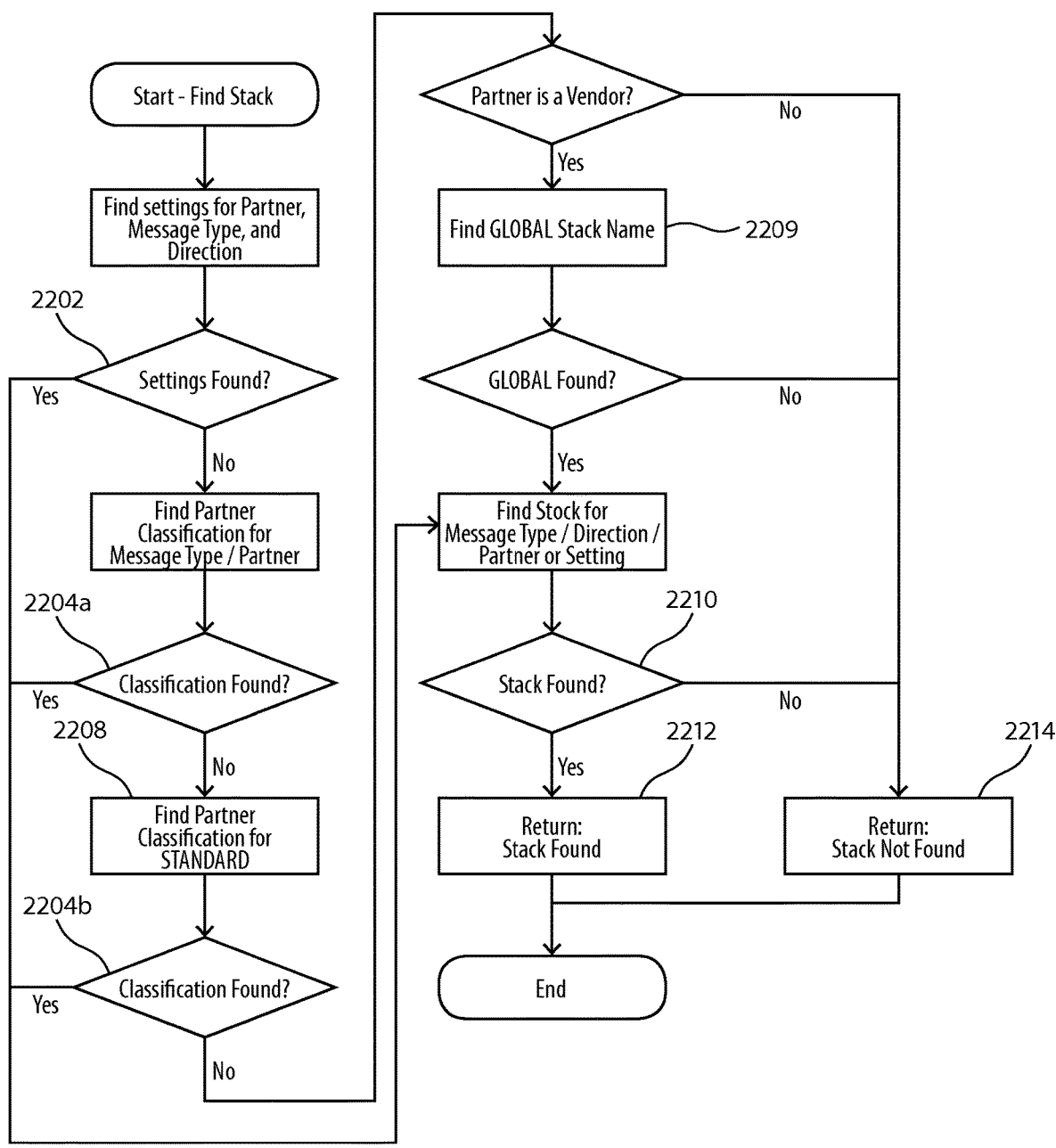
FIG. 22 is a flow diagram illustrating a re-route from a standard process to and through a custom process, according to an exemplary embodiment.

FIG. 22 is an exemplary process flow 2200 associated with the disclosed embodiments. More particularly, FIG. 22 illustrates the location of a custom stack, and the strings, rules, and configurations associated therewith, referenced generally with respect to the foregoing figure. In FIG. 22, the exemplary process flow seeks the settings 2202 and classification 2204a, 2204b for a particular partner, message, or type. If a unique custom stack is found 2210, it may be initiated to run time by step 2212. If a dedicated custom stack is not found 2214, but if there is a standard custom stack 2208 for, for example, a partner of the type assessed, that standard custom stack may be initiated to run time. If no custom or standard stack is located for the particular partner, message, or type, a global custom stack 2209 may be initiated to run time at step 2212. If the partner, message, or type does not fit within any classification or configuration that would necessitate a custom stack, no custom stack is initiated and the process is returned to the standard flow.

Figure 23:
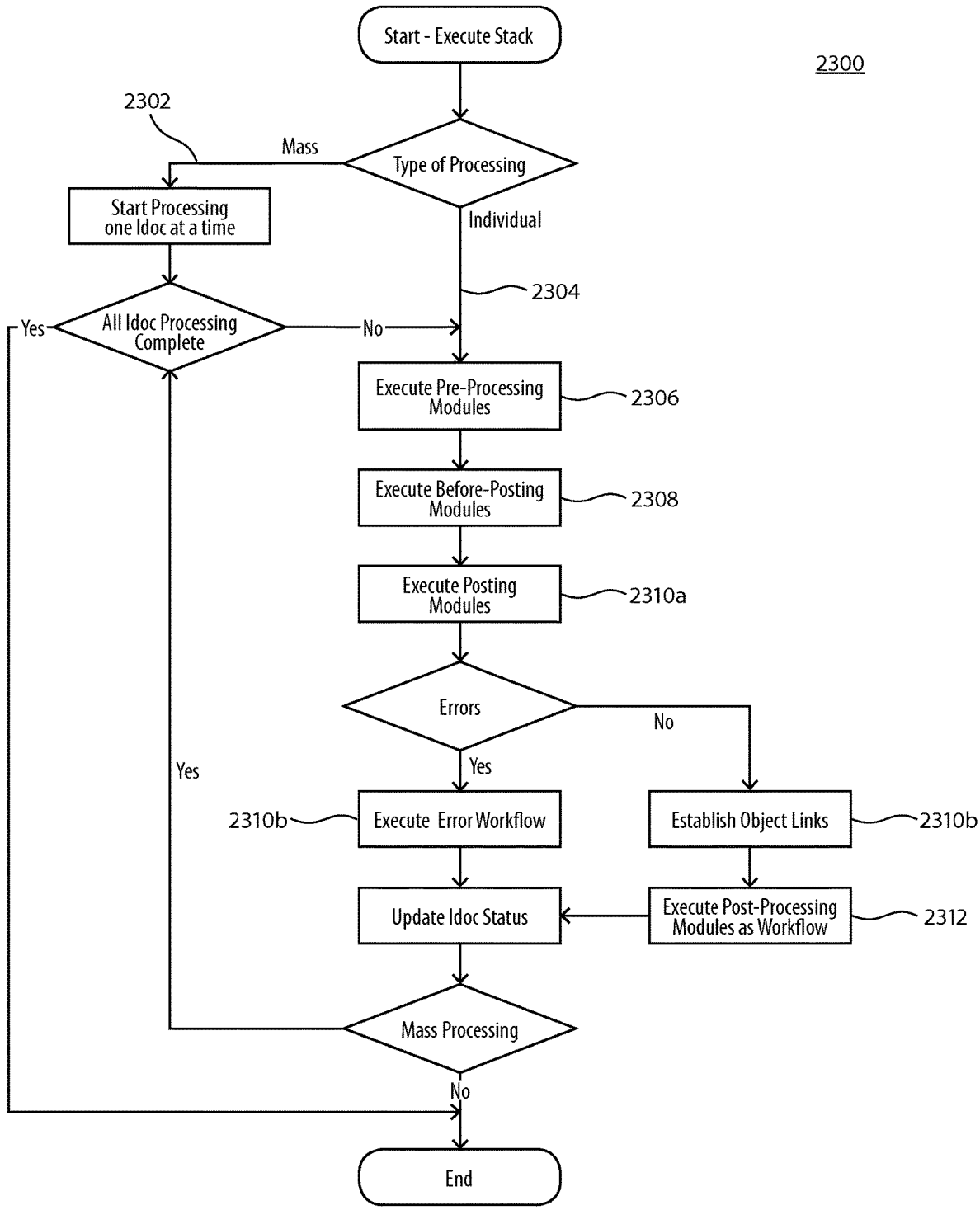
FIG. 23 is a flow diagram illustrating a re-route from a standard process to and through a custom process, according to an exemplary embodiment.

FIG. 23 is a flow diagram illustrating an exemplary flow of the processing of a custom stack at run time 2300. In the illustration, the execution of the custom stack may vary as to whether the process relates to multiple, or "mass", steps 2302, such as may relate to multiple IDocs, or to a single step 2304, such as may relate to a single IDoc, message, or data point. In either case, pre-processing modules of the custom stack are executed 2306, followed by before processing modules 2308, followed by in-processing modules 2310, 2310a-b. Of course, post-processing modules 2312 may also be executed if pre-, before-, and in-processing modules run error free. If errors do occur, they may be treated in accordance with the custom stack modules. Data, such as IDocs, are updated according to the processing, and the foregoing steps are repeated for additional documents in a mass execution.

Figure 24:
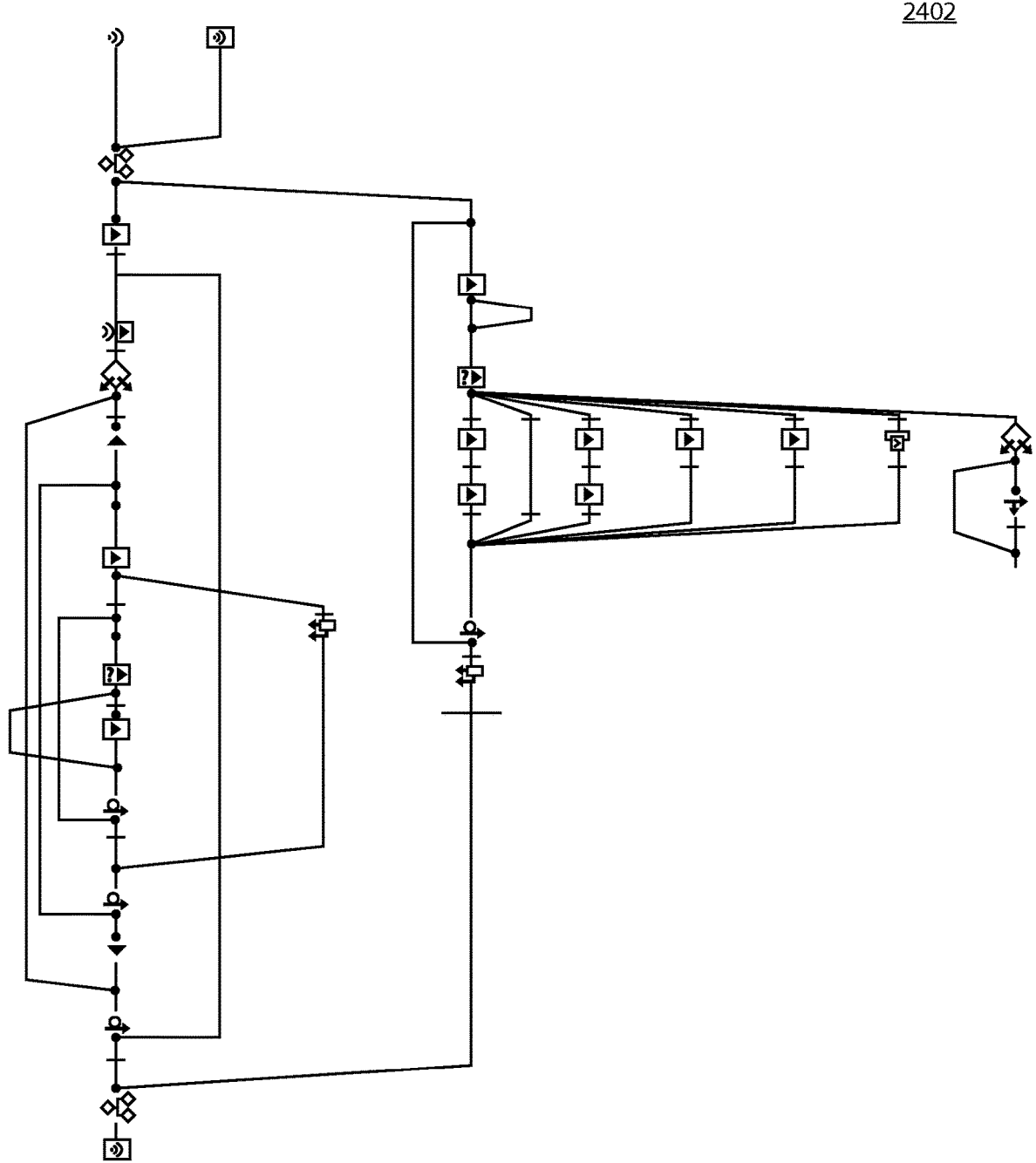
FIG. 24 is a flow diagram illustrating an exemplary custom process according to an exemplary embodiment.

FIG. 24 illustrates an exemplary flow for a particular process in the disclosed systems. In the illustration, an inbound notification handler custom workflow 2402 is shown for: evaluating an application log and, in the case of critical messages collected, triggering an event (EPICErrorOccured) to start the an inbound error handling workflow (WS91000020); otherwise analyzing the application log; analyzing IDoc details; re-processing an IDoc if needed (such as in the event of an error); deletion of an IDoc if no longer relevant; and, in case that the processing stack contains "Special Error Handling" modules, triggering an event referenced as "INBOUNDERROR" for particular data classes, which in this particular example is data class ZCL_EPCB_CTL_IDOC_PPWRKFLW. Of note in this example, each workflow task or module is assigned a code, to allow for it to be modularly employed outside of the standard flow in other custom stacks in the future. For example, tasks include: TS91000062—Create PP Workflow Object Ref; TS91000056—Execute Post Processing Module; TS91000060—Exceptions while Processing EPIC Error Handling Module; TS91000057—Display Application Log; TS91000063—Determine DeadLine; TS91000054—User Decision: IDoc Error Handling; TS91000041—(Re)-Process IDoc; TS91000042—Refresh IDoc Attributes; TS91000043—Delete IDoc; TS91000042—Refresh IDoc Attributes; TS91000039—Display Application Log; TS91000044—Display IDoc Details; and TS91000064—Deadline Date Missed. Of note, any variable definitions, names, configurations, or subject rules disclosed herein throughout are solely exemplary and non-limiting in nature.

Figure 25:
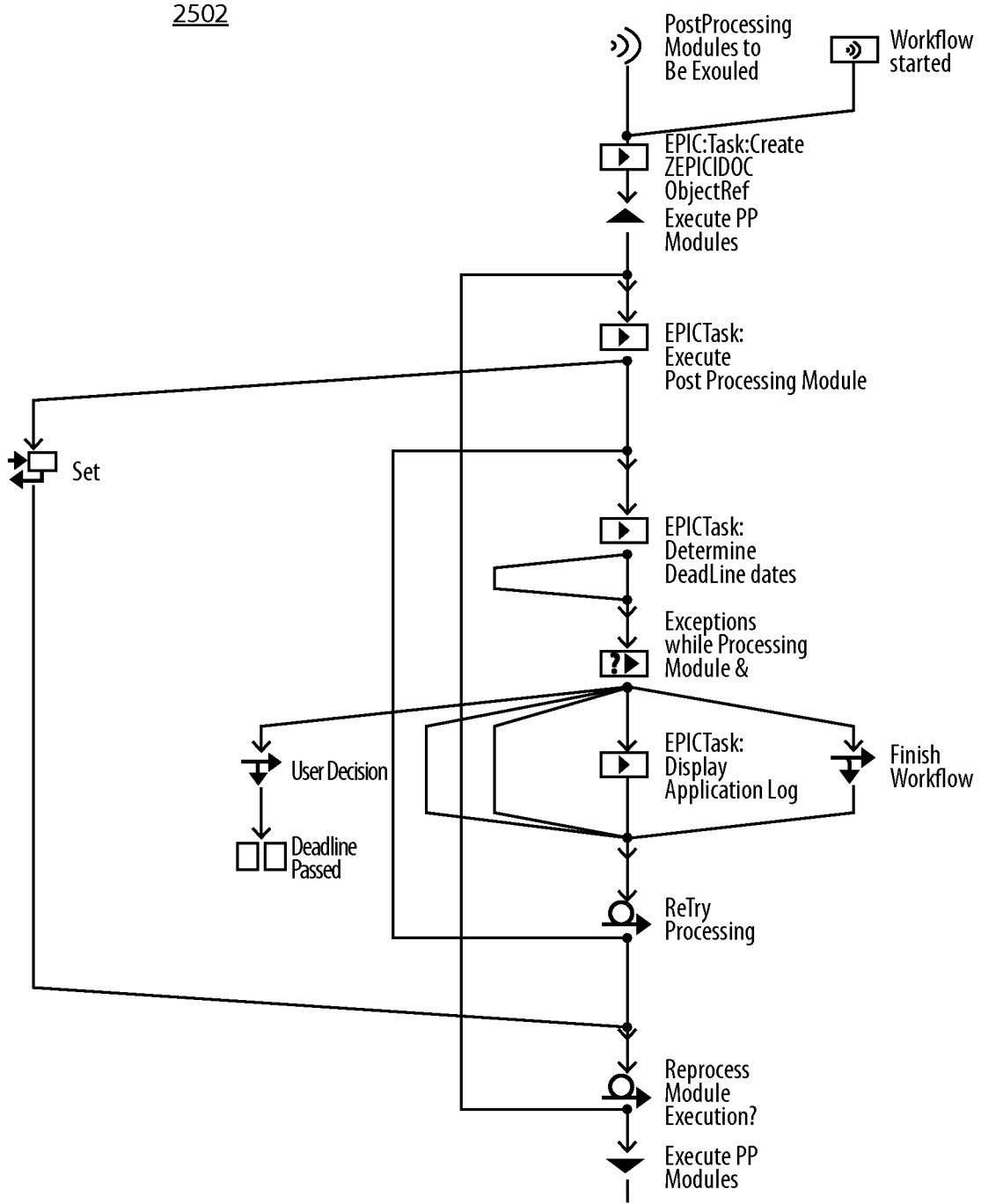
FIG. 25 is a flow diagram illustrating an exemplary custom process according to an exemplary embodiment.

FIG. 25 illustrates an exemplary embodiment of the execution of a post processing manager custom stack 2502. In the illustration, a custom post processing workflow is triggered asynchronously (by means of function module Z_EPCB_EVENT_RAISE_INUPD) in custom stack modules if the custom post processing is defined (by method module EVA_PROCESS_STACK) and if there were no critical errors previously reported.

In the example of FIG. 25, workflow task TS91000056 will carry out all post processing using underlying class method PROCESS_MODULE. In case of an error exception, the workitem will be assigned to a group of users maintained under workflow rule 91000004 (Rule: Message/Partner/Plant). This processing will continue to a loop until any error is resolved or until the process is explicitly closed by a user.

Thus, the disclosed exemplary embodiments improve existing functionality of standard process flow business software, such as by supplementing existing standard process functionality to address gaps in, for example, IDoc and EDI communications. Moreover, the disclosed embodiments may provide an enterprise architecture that follows a uniform design to ensure that a core engine processes all messages and generates alerts when actionable events (errors and process notifications) occur. Further, the disclosed embodiments support a wide range of business processes and message types using configurable "plug-and-play" module elements.

The various illustrative logical blocks, modules, algorithms and virtual circuits described in connection with the disclosure herein may be implemented or performed with a general-purpose processor, a digital signal processor (DSP), an application specific integrated circuit (ASIC), a field programmable gate array (FPGA), or any other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method, display, or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in software, wherein the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another, such as over a local or wide area network, a cellular network, a satellite network, or the like. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is rather to be accorded the widest scope consistent with the principles and novel features disclosed herein.

What is claimed is:

1. A method of providing a customized business process within a standard business process flow system, comprising:
   receiving the standard business process flow;
   developing in a developmental graphical user interface of a plurality of object-oriented custom modules indicative of a plurality of custom business steps;
   providing a plurality of semi-private data libraries and semi-public data libraries, capable of storing at least configurations and rules applicable to the plurality of object-oriented custom modules;

selecting, via a drag and drop graphical user interface, multiple ones of the plurality of object-oriented custom modules for inclusion in a custom process stack;

sensing a trigger indicated by at least one of the configurations and the rules;

diverting the standard business process flow to the custom process stack according to the configurations and rules upon receipt of the trigger; and returning an output of the custom process stack to the standard business process flow.

2. The method of claim 1, wherein the standard business process flow produces an intermediate document, and wherein the output comprises a modification to the text of the intermediate document.

3. The method of claim 1, wherein the trigger comprises a business partner.

4. The method of claim 1, wherein the trigger comprises a message type.

5. The method of claim 1, wherein the trigger comprises an error in the standard business process flow.

6. The method of claim 1, wherein ones of the plurality of object-oriented custom modules are re-usable after entry into at least one of the libraries.

7. The method of claim 1, wherein the drag and drop graphical user interface is at least partially capable of selecting at least a portion of a one of the plurality of object-oriented custom modules entered into at least one of the libraries.

8. The method of claim 1, wherein the drag and drop graphical user interface further comprises a drop-down selection interface.

9. The method of claim 1, wherein the drag and drop graphical user interface further comprises a selectable file tree interface.

10. The method of claim 1, wherein at least one of the developmental graphical user interface and the drag and drop graphical user interface comprises a mobile app interface.

11. The method of claim 1, further provides comprising providing an administrator graphical user interface.

12. The method of claim 1, wherein at least one of the developmental graphical user interface and the drag and drop graphical user interface comprises a web-based interface.

13. The method of claim 1, further comprising providing a network interface, wherein at least the standard business process flow is received over the network interface.

14. The method of claim 1, wherein the developmental graphical user interface comprises an application programming interface (API).

15. The method of claim 1, wherein the output comprises an alert indicated by a one of the configurations to at least one recipient indicated by a one of the rules.

16. The method of claim 15, wherein the alert comprises an email.

17. The method of claim 15, wherein the alert comprises an in-app indicator.

18. The method of claim 1, further comprising:
providing a reporting interface capable of providing at least status of at least the standard business process flow and the custom process stack.

19. The method of claim 1, further comprising:
providing a partner interface capable of providing data regarding at least the custom process stack to one or more partners indicated by at least one of the rules.

20. The method of claim 1, wherein the custom stack at least partially comprises a portion of the standard business process flow.

* * * * *